United States Patent [19]
Soros

[11] Patent Number: 5,193,964
[45] Date of Patent: Mar. 16, 1993

[54] SLEWING BRIDGE MATERIAL HANDLING APPARATUS CAPABLE OF CONTINUOUS MATERIAL FEEDING DURING MOVING AND SLEWING

[75] Inventor: Paul Soros, New Canaan, Conn.
[73] Assignee: Soros International, New York, N.Y.
[21] Appl. No.: 909,046
[22] Filed: Jul. 6, 1992

Related U.S. Application Data
[63] Continuation-in-part of Ser. No. 726,586, Jul. 8, 1991.

[51] Int. Cl.⁵ .............................................. B65G 67/60
[52] U.S. Cl. .................................... 414/140.9; 198/588
[58] Field of Search ................. 198/508, 588; 414/133, 414/140.8, 140.9

[56] References Cited

U.S. PATENT DOCUMENTS
| | | | |
|---|---|---|---|
| Re. 32,081 | 2/1986 | Soros | 414/133 X |
| 1,311,298 | 7/1919 | Stuart | 198/508 |
| 3,343,651 | 9/1967 | Oury et al. | 198/588 X |
| 3,499,522 | 3/1970 | Novak | 414/140.8 X |
| 4,082,181 | 4/1978 | Berthold et al. | 414/140.9 X |

OTHER PUBLICATIONS
"The Linear Shiploader, An Overview", by Paul Soros, in *Bulk Solids Handling*, vol. 11, No. 1, Mar. 1991.

Primary Examiner—Michael S. Huppert
Assistant Examiner—Janice Krizek
Attorney, Agent, or Firm—Cohen, Pontani, Lieberman, Pavane

[57] ABSTRACT

This invention relates to a material handling apparatus, commonly known as a slewing bridge shiploader or linear shiploader, having front and rear pivotal supports and a movable boom traversing the bridge. The front end support of the bridge is movable along a front linear track extending parallel to the ship and the rear support is movable along a rear linear track extending in a direction perpendicular to the front linear track. The bridge contains a conveyor running along its length and also running on the boom, which conveyor is fed from the rear end of the bridge. The conveyor slopes upward from its feed point at the rear of the bridge to the height of the boom, thereby permitting a reduction in bridge span. As the front end of the bridge moves along the front track, the rear end and its support move longitudinally along the rear track, while simultaneously the rear end of the bridge pivots relative to the rear support. The conveyor feed point is oriented over the rear end pivot point. A movable trestle carrying a second conveyor is linked to the rear end of the bridge for concomitant movement therewith. The terminating end of the second conveyor is oriented above the feed point of the bridge-mounted conveyor. As the rear end of the bridge pivots and moves longitudinally, the trestle moves with it, thereby ensuring continuous feeding of the bridge-mounted conveyor during movement of the bridge.

18 Claims, 8 Drawing Sheets

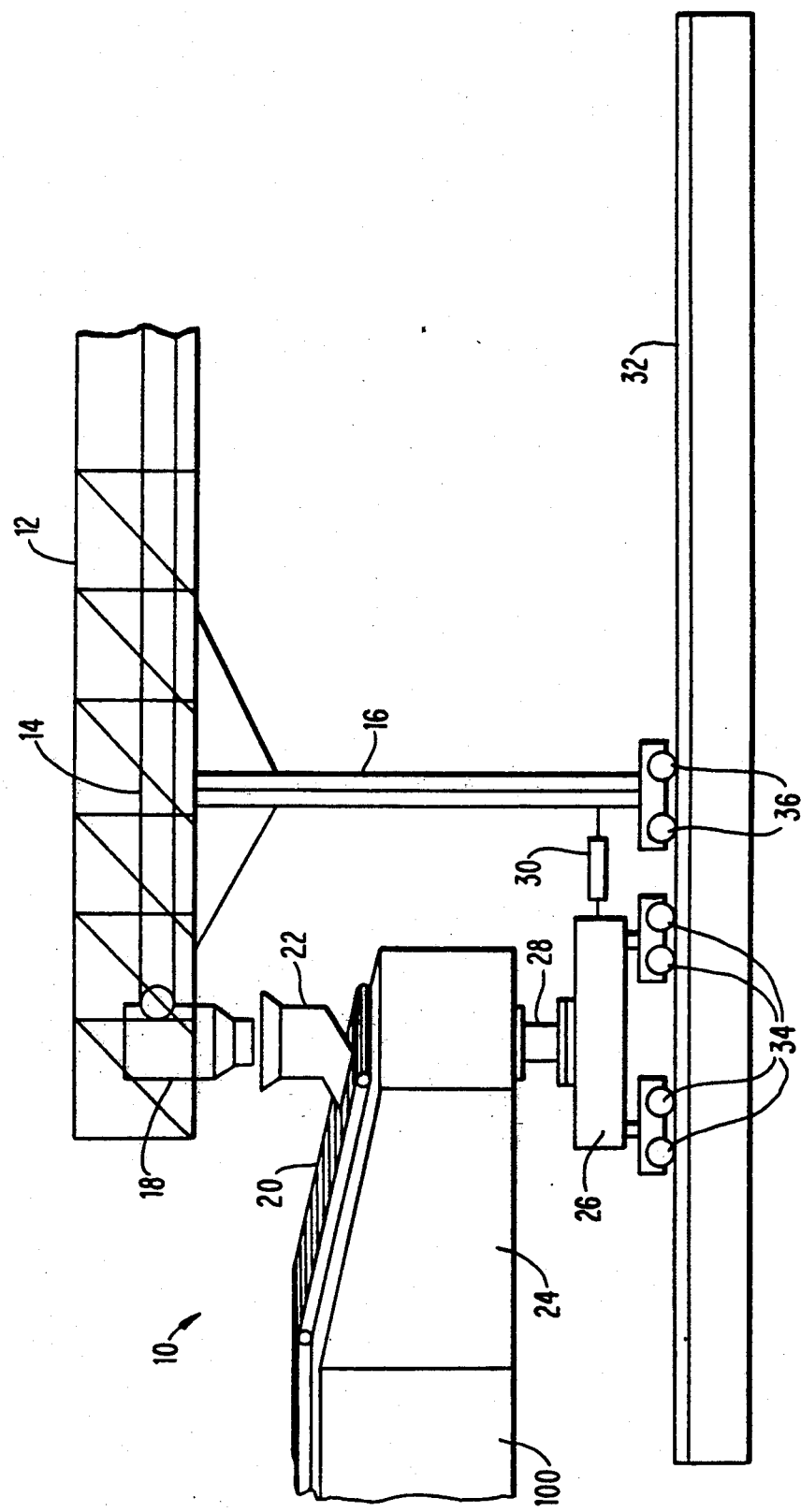

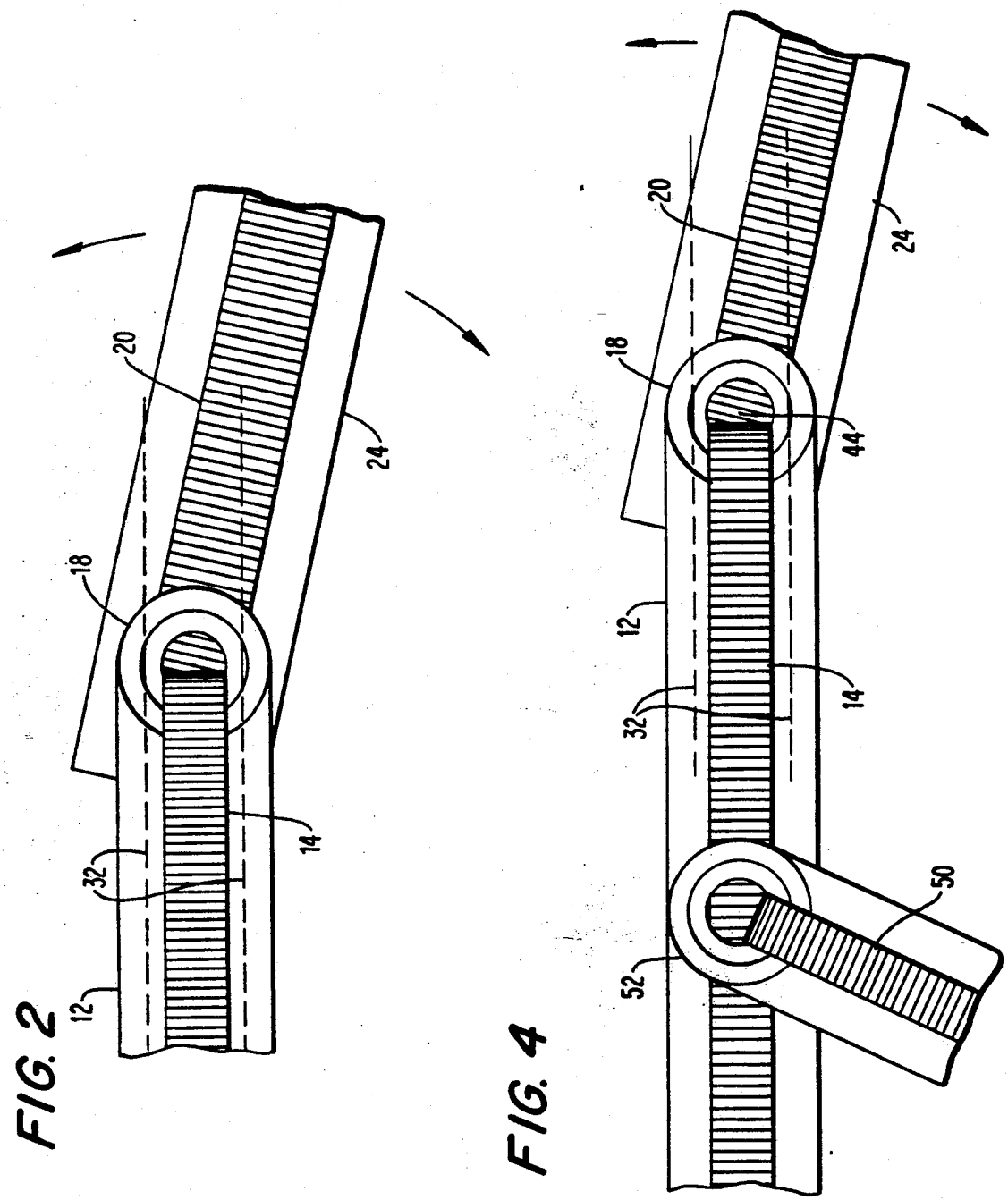

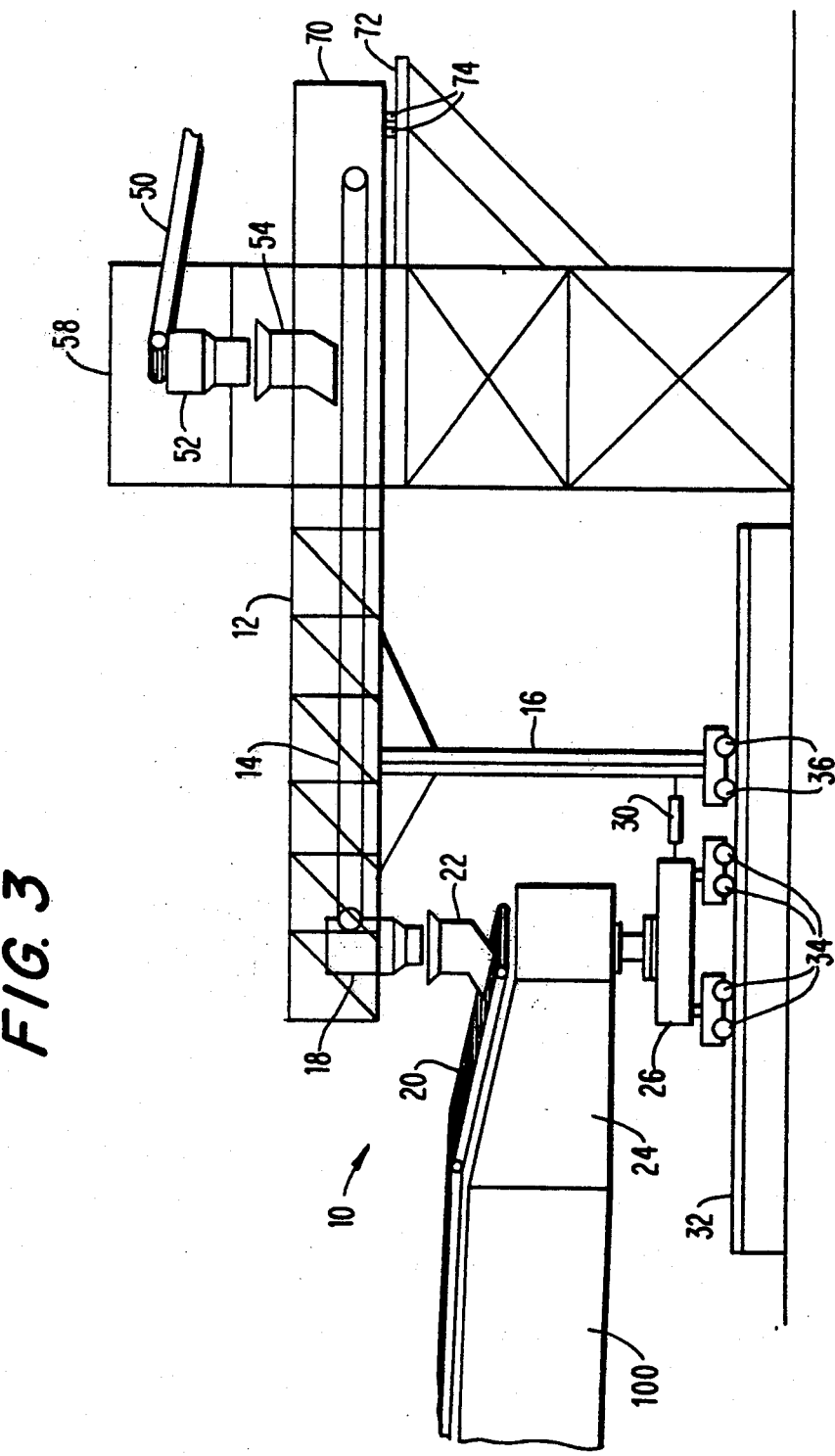

SLEWING BRIDGE MATERIAL HANDLING APPARATUS CAPABLE OF CONTINUOUS MATERIAL FEEDING DURING MOVING AND SLEWING

CROSS-REFERENCE TO RELATED APPLICATIONS

This application is a Continuation-in-Part of U.S. patent application Ser. No. 07/726,586, filed Jul. 8, 1991.

FIELD OF THE INVENTION

The present invention relates to a material handling apparatus, specifically a slewing bridge shiploader but known generally as a linear shiploader or linear loader, having front and rear pivotal supports. The front support of the bridge is powered to move along a straight or linear track extending in a direction parallel to the axis of the ship to be loaded and the rear support is movable along a rear track which extends in a direction perpendicular to or approximately perpendicular to said straight track. The bridge contains a conveyor running parallel to its axis which is fed at the rear end of the bridge from another conveyor in line with or at an angle to the rear track. The bridge-mounted conveyor begins proximate its feed point at the rear end of the bridge. The bridge-mounted conveyor is preferably configured so as to be upwardly sloping at its feed point, at an angle to the horizontal, until assuming a predominately horizontal orientation as it extends along the length of the bridge, where it continues along the length of a boom which is movably mounted on the bridge. The boom is extendable past the forward end of the bridge, so as to enable the bridge-mounted conveyor to continuously feed material from its feed point to a ship or other carrier. The present invention addresses and solves the problems associated with continuous feeding of such a bridge mounted conveyor when the rear support for said bridge is moving both longitudinally and pivotally. Additionally, as a result of the preferred initial upward slope of the bridge-mounted conveyor proximate its feed point, the overall length of the bridge can be significantly reduced, leading to great savings of space, material and, accordingly, money.

BACKGROUND OF THE INVENTION

Material handlers of the type contemplated by the present invention are usually extremely large and complex, requiring significant investments in time, material, engineering and, of course, money. Such apparatus are normally associated with shiploaders, and particularly known as linear shiploaders or linear loaders. Such an apparatus is described in U.S. Pat. No. 3,856,159 issued to the inventor Dec. 24, 1974, and re-issued on Feb. 11, 1986 as U.S. Pat. No. Re. 32,081, the contents of both being incorporated herein by reference. The linear shiploader has become very popular and is used in a number of rather massive shiploading installations throughout the world today. Heretofore, all of the linear loaders incorporated a front pivot movably mounted on rails extending transversely of the bridge and substantially parallel to the vessel being loaded, and a fixed, rear pivot support which included means for permitting longitudinal movement of the bridge relative to said fixed pivot support. Such a construction, however, involved alternation in the direction of deflection under load of the rear part of the bridge, requiring special design attention. An alternative embodiment of the linear loader has been suggested in the aforementioned patents whereby the rear pivot support is not fixed but rather mounted on rails extending perpendicularly to the front end rails. However, as described in the aforementioned patents, such an embodiment creates particular difficulties in continuously feeding a conveyor mounted on the slewing bridge since there is no fixed pivot point at which to feed the bridge-mounted conveyor. For this reason, all existing installations, representing an installed base valued at several hundred million dollars, utilize stationary feeding and a fixed rear pivot support. An overview of these existing installations and the design criteria pertinent to each installation is described in an article by the inventor published in Bulk Solids Handling magazine, Vol. 11, No. 1, dated March, 1991.

The present invention is directed to solving the feeding problem for a linear loader having the alternate structure described above, namely a movable rear pivot support, and also at reducing the overall cost and dimensions of the bridge itself through a particular upwardly sloping configuration of the bridge-mounted conveyor proximate its feed point, which configuration could not be utilized in the previous loader designs due to the absence of a fixed feed point on the bridge-mounted conveyor.

OBJECTS AND SUMMARY OF THE INVENTION

Briefly, the present invention relates to a linear loader with a movable pivoting rear support, or, as may be interchangeable used throughout this application, a linear bridge shiploader or linear shiploader. A linear shiploader comprises a bridge which is supported at two points, a front end proximate the ship side which is movable along straight line track rails substantially parallel to the longitudinal axis of the carrier or ship to be loaded, and a rear end away from the carrier or ship. The rear end is also mounted upon rails, which are oriented substantially perpendicularly to the longitudinal axis of the ship or carrier to be loaded. Both the front and rear supports are capable of pivotal movement. When the front end of the bridge is moved along the rails which run parallel to the carrier, the rear end support is accordingly forced to pivot while at the same time to move in a longitudinal direction along the perpendicular set of rails together with the rear end of the bridge. Therefore, the rear end of the bridge moves toward or away from the carrier as the front end moves parallel to the longitudinal axis of the ship or carrier being loaded. The movement of the pivoting rear end of the bridge is highly complex. The velocity, as well as the motion and the amount of pivotal rotation of the rear end of the bridge varies as a function of both the traversing speed of the front end as it moves along the front rails and the distance of the front end support from the approximate center of the front track as measured along its shipside length.

Since the bridge is supported at two points which are fixed relative to its length and adjacent or at opposite ends of the bridge, the deflection of the bridge under load is always in one direction, meaning that there is no stress cycling. This is so because the pivot point which is the support point for the rear end of the bridge is at a fixed point on the bridge but movable as the entire bridge moves, whereby to avoid any portion of the bridge, especially the rear end portion, from at times being in compression and at other times being in tension. This is in contrast to existing commercial embodiments, in which, in order to have a fixed rear end feed point, the rear pivot point remained fixed and the rear end of the bridge pivoted on and moved longitudinally relative to said fixed rear pivot. In the earlier commercial embodiments, the load bearing point of the rear end of the bridge changed as the bridge moved longitudinally relative to the fixed rear end pivot point. Therefore, the overall length or span of the bridge relative to the front and rear supports varied, making the rear end of the bridge at times a part of the span, but at other times a cantilever, since the rear end would in some positions extend past the rear end support and hence past the rear end pivot point, whereby to reverse or cycle the direction of stress in said rear end portion.

It should be recognized that the present embodiment of the moving rear pivot results in a span of fixed length and eliminates stress reversal, thereby allowing more cost effective use of materials to construct the bridge. In the present commercial versions of linear shiploaders, only the shortest span of the bridge—that is the distance between the fixed rear pivot and the front end support when the bridge is perpendicular to the axis of the ship being loaded—is available to accommodate the required traversing motion of a superstructure, typically known as a boom, which is normally movably mounted on bridges of this type. In the currently presented version the entire length of the bridge span is available since the span length does not vary, thereby allowing for a more balanced and therefore more economical design of the bridge mounted movable superstructure.

Additionally, in accordance with a presently preferred form of this invention, the bridge-mounted conveyor is so oriented as to slope upward from its point of origin on the rear end of the bridge, proximate its feed point. The conveyor then continues its upward slope so as to rise to the level of the boom, whereupon the conveyor is carried on the boom as the boom traverses the bridge during feeding. The conveyor terminates or trips at the end of the boom which extend over the ship or carrier being loaded. The upward slope at the feed point allows the overall length of the bridge to be further shortened, since if the conveyor is oriented horizontally under the feed point, a significant distance is required between the feed point and the point at which the conveyor rises to traverse the boom. This distance is required in order to prevent the natural tendency of the conveyor to lift from its supports under tension, thereby running the risk of losing material or worse, mechanically weakening or even breaking the belt.

The elimination of a fixed pivot point at which to feed material onto the linear loader creates a problem heretofore unsolved in the art, namely how to provide continuous material feeding at the rear end of the linear shiploader as the rear end moves linearly in a direction perpendicular to the ship while simultaneously pivoting. This problem, when solved, also creates the opportunity for further economies which may be realized by sloping the bridge-mounted conveyor upward at its feed point to allow for shortening of the overall bridge length.

It is therefore an object of this invention to provide a linear shiploader with a rear end support which is capable of movement in a longitudinal direction while simultaneously pivoting, without changing the relative point of support along the length of the bridge, that is capable of being continuously fed from the rear end with material while the rear end simultaneously pivots and moves longitudinally as described.

It is a further object of this invention to provide a continuously fed linear shiploader which may be constructed in accordance with the present invention regardless of the orientation of the conveyor which feeds the shiploader, commonly referred to as the moving head or shuttle conveyor.

It is yet another object of this invention to provide a linear shiploader which has a span of fixed length so as to allow the entire span to be utilized for the traversing movement of a movable superstructure, known as a boom, which is movably mounted on the bridge.

It is a still further object of this invention to provide for a bridge-mounted conveyor which is upwardly sloping from its feed point on the rear end of the bridge so as to reduce the distance required to be travelled by the conveyor along the length of the bridge as the conveyor rises to the level of the boom upon which the conveyor further travels.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. is a side view, partly schematic and partly diagrammatic, of the rear end portion of a slewing bridge shiploader constructed in accordance with the present invention;

FIG. 2 is a top plan view of a portion of the present invention shown in FIG. said bridge mounted conveyor shown oriented in pivoted relation beneath a conveyor which feeds material thereto;

FIG. 3 depicts an embodiment of said invention wherein a conveyor which feeds material to the bridge mounted conveyor approaches the bridge at an angle to the direction of travel of the rear pivot support for the linear bridge loader;

FIG. 4 is a top plan view of a portion of the embodiment shown in FIG. 3;

DETAILED DESCRIPTION OF THE PREFERRED EMBODIMENTS

Figure 5:
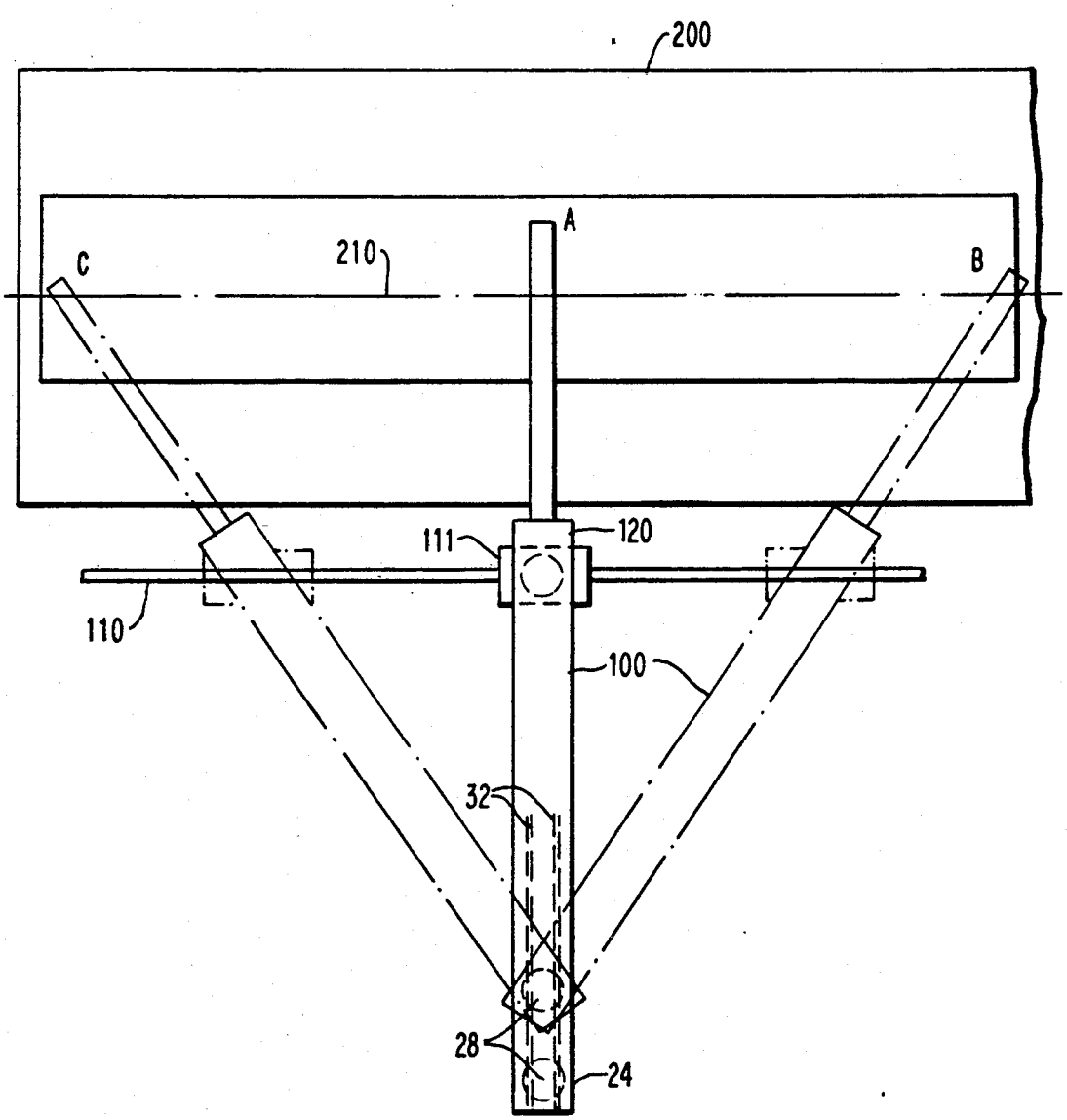
FIG. 5 is a top plan view of the linear bridge loader.

Referring now to the drawings in detail and with initial reference to FIGS. 1 and 5, a material handling apparatus 10 is shown as a shiploader 10, more specifically a linear shiploader. The shiploader 10 is capable of loading a ship 200 or other carrier which has a longitudinal axis 210 which is generally perpendicular to the longitudinal axis of the shiploader 10. The front portion 120 of shiploader 10 is pivotally supported on a motor driven support 111 which is movably mounted on rails 110, as by wheels 113 (FIG. 7) for powered linear movement in a direction which is generally parallel to the longitudinal axis 210 of ship 200 to be loaded. The rear end 24 of the bridge 100 is mounted on rear pivot 28 which is mounted on a support structure 26 that is in turn mounted on wheel carriages 34 which are rollably mounted on rails 32 which extend in a direction substantially perpendicular to the rails 110. As the front end 120 is driven to move along the rails 110, a longitudinal force is exerted along the bridge 100 which forces the movable rear end 24 of the bridge to move along rails 32 either toward or away from the ship 200. At the same time that the longitudinal movement is occurring, slewing or pivoting movement occurs as the rear end 24 pivots on rear pivot 28. In the currently preferred embodiment the motive force for the entire structure is provided by the drive motor in the front end support 111 which drives the wheels 113 of the front portion 120 along rails 110, thereby imparting the longitudinal and pivotal movement of the rear end 24 through the body of the bridge itself. It should be recognized that with appropriate controls, the rear end can be provided with a separate drive to drive the rear end support so as to augment the motor output of the front end motor drive, provided that the rear end drive is operated in conjunction with and in response to—the front end drive. Such a configuration, however, would require a control system which may be inordinately complex and expensive by today's standards, and is unnecessary if the illustrated embodiment of FIGS. 1 and 5 is adopted.

As can be seen best in FIG. 5, the rear pivot 28 moves concomitantly with the rear end 24 of the shiploader 10. For example, when the bridge 100 is in position A perpendicular to vessel 200, the rear end 24 of the bridge 100 is at maximum distance from the ship. As the front end 120 of the bridge is driven to move along rails 110 toward right hand position B (shown in dashed lines in FIG. 5) the rear end 24 of the bridge 100 pivots around pivot 28 while the rear end 24 and pivot 28 move linearly toward the ship along rails 32. The reverse pivotal and longitudinal movement occurs in driving the bridge 100 from position B to position A and then in turn to position C. As can be seen, as the front end of the bridge is driven linearly along rails 110 along the length of the ship 200 by motor driven support 111 parallel to the longitudinal axis of the ship 210, the rear end 24 of the bridge 100 and the pivot 28 around which the bridge 100 pivots are continuously moving along a longitudinal axis substantially perpendicular to the longitudinal axis of the ship 210. In turn, a bridge conveyor 20 which is carried upon the bridge 100 is also moving longitudinally and pivotally. Conveyor 20 is capable of transporting solid material, such as, for example, ores, coal and grains, as well as bags, packages and the like.

In the absence of the present invention, such an arrangement would normally create great difficulty in feeding bridge conveyor 20, since the conveyor systems which are used to deliver material to shiploaders such as this are massive, fixed structures. The present invention however, as will be more fully described hereinafter, provides for a transfer point that is fixed relative to the bridge 100, but which transfer point is movable relative to the ground, dock or other structure upon which the shiploader is built, whereby bridge conveyor 20 can be continuously fed material while the rear end 24 of the bridge 100 moves longitudinally and pivotally. This is achieved by mounting a conveyor 14 on a movable trestle 12 which is operatively connected to the support 26 for the rear end 24 of bridge 100 for concomitant linear movement therewith, and also by providing a hopper 18 and chute 22 which are in a fixed position relative to the pivot 28, so material may be fed from conveyor 14 through the hopper 18 and chute 22 onto the bridge conveyor 20, regardless of the movement of the rear end 24 of the bridge 100.

Referring now in greater detail to FIG. 1, the rear end 24 of the bridge 100 is pivotally mounted on the support structure 26 via the pivot 28. The pivot 28 may be configured as a spindle, turntable, bearing, or other similar known pivot device for allowing pivotal movement of a large structure around a pivot point. Rear end 24 pivots on pivot 28. The support structure 26 upon which the pivot is mounted is shown as a platform, but may be configured in any physical size or shape providing it is capable of supporting the weight of the rear end 24 of the shiploader 100. Support structure 26 is movably mounted via wheels 34 on rails 32. The rails 32 are oriented in a direction perpendicular to the longitudinal axis 210 of the ship 200 or other carrier to be loaded. As described, the rear end 24 may move along rails 32 in a direction toward or away from the ship on said rails. Trestle 12 which carries the conveyor 14 is positioned above the rear end 24 of the bridge 100. The trestle is held in elevated position above the rear end 24 of the bridge 100 by a support member 16. Adequate clearance is provided between support member 16 and the rear end 24 to accommodate the pivotal motion thereof. The trestle is also movably mounted upon the rails 32 via wheel assembly 36. The trestle is thereby capable of moving concomitantly in the same directions as is the rear end 24 of the bridge 100. Preferably, the connection between support structure 26 and the support member 16 is a linking member 30 that is substantially rigid, and therefore when the rear end 24 of bridge 100 moves along rails 32 the trestle 12 moves along rails 32 in the same manner as, and at a fixed distance from, the rear end 24 of the bridge 100. The connecting means between support structure 26 and support member 16, in lieu of a rigid link 30, may be any other type of connecting means capable of maintaining support structure 26 and support member 16 substantially fixed relative to one another, such as, for example, a tracking system like a servo system, an optical, electromagnetic or electronic tracking system or a computer controlled electro-mechanical link. Thus, for example, the wheeled support 36 for support member 16 may be moved not by a rigid mechanical link but by a separate drive motor, in which case a tracking system may be employed to actuate said separate drive motor to drive support member 16 back and forth in response to the movement of support structure 26 to maintain a fixed relative position between the two. Additionally, the support structure 26 may be made large enough to mount support member 16 directly upon it to provide concomitant movement therebetween, provided adequate clearance is provided for the pivotal movement of rear end 24.

Conveyor 14 terminates in a hopper 18 which is affixed to trestle 12, and oriented above the pivot 28 at the rear end 24 of the bridge 100. Hopper 18 feeds the chute 22 which is oriented above bridge conveyor 20 in alignment with the pivot 28. Chute 22 is preferably mounted on the rear end 24 of the bridge 100. Alternatively, if so desired, hopper 18 and chute 22 can be combined into one single structure affixed to either the trestle 12 or the rear end 24 of the bridge 100, provided a suitable bearing arrangement is interposed between them to enable rotational motion of each relative to the other. In any of the previously mentioned configurations however, the conveyor 14 will feed material through the hopper 18 and chute 22 onto bridge conveyor 20 continuously since the relative orientation of conveyor 14 and the feed point of bridge conveyor 20, which lies in alignment with pivot 28, is fixed. This orientation is continuous even though the rear end 24 is moving simultaneously linearly and pivotally, due to the fixed connection between trestle 12 and rear end 24, preferably provided by linkage member 30.

The fixed relative position of conveyor 14 over bridge conveyor 20 can be seen in FIG. 2. As shown, the trestle 12 carrying conveyor 14 is oriented above the rear end 24 of the bridge 100 on which is carried bridge conveyor 20. As the rear end 24 pivots and moves linearly, the conveyor 14 remains continuously oriented over the pivot 28, thereby enabling material to be transferred from conveyor 14 to bridge conveyor 20 continuously during the movement of the rear end 24 of the bridge 100.

Figure 6:
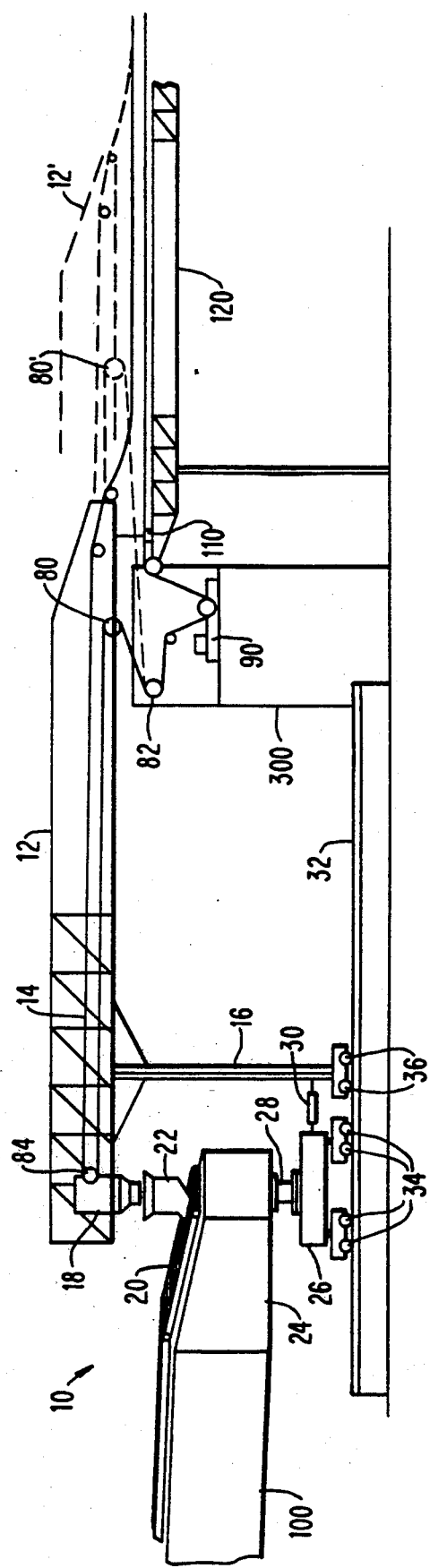
FIG. 6 depicts another embodiment of the invention in which a conveyor which feeds material to the bridge mounted conveyor approaches the bridge in substantial alignment therewith.

When the conveyor 14 is oriented perpendicularly to the longitudinal axis 210 of ship 200 to be loaded, as shown in FIG. 6, should the trestle 12 which carries conveyor 14 move to the right on rails 32, in a direction away from the ship being loaded, slack will be formed in conveyor 14 by the movement of the head or terminating end of conveyor 14 backward against the direction of travel of the conveyor. In order to provide continuous tensioning of the conveyor, thereby allowing continuous feeding of the shiploader 10, a combination of fixed and movable pulleys 80 and 82 is employed to vary the effective length of the conveyor 14 and thereby prevent the development of any slack along conveyor 14 as the rear end of the ship loader 24 moves in a direction away from the ship 200.

FIG. 6 shows trestle 12 being segmented into a movable portion linked to rear end support 26 via linkage means 30, and a fixed portion 120 which supports the remainder of the conveyor 14. Additionally, a drive housing 300 is shown housing a drive system 90 for the conveyor 14. Also located in drive housing 300 is pulley 82 which remains in fixed position in the drive housing 300. Mounted on trestle 12 for movement therewith is pulley 80 which carries a portion of the conveyor 14. As the rear end 24 of the shiploader moves away from the ship 200, pulley 80 and trestle 12 are moved back to positions 80' and 12' respectively. When the trestle 12 is in position 12', the distance between fixed pulley 82 and the trestle-mounted movable pulley 80 in position 80' is equal to the distance which has been travelled by the trestle 12. Therefore, it can be seen that the amount of slack in conveyor 14 which would have formed by the rearward movement of trestle 12 is equal to the distance travelled by the trestle 12. Accordingly, the slack is taken up by the need for the conveyor 14 to travel the additional distance between fixed pulley 82 and the movable pulley 80 in position 80'. This relationship will hold throughout the range of movement of the movable trestle 12, thereby keeping the tension on conveyor 14 constant as trestle 12 moves to and fro. The rear end portion of trestle 12, which supports movable pulley 80, may be supported by a wheel assembly 110 which rides along the upper surface of trestle portion 120, or it may be supported for horizontal movement in any other suitable fashion. Further, the drive means 90 may be located at any suitable location along the length of conveyor 14, not necessarily where shown. Additionally, the drive housing 300 which supports fixed pulley 82 may, if the drive 90 is located elsewhere, be any suitable housing or support which can maintain the pulley 82 fixed relative to trestle portion 120.

FIG. 6 depicts an embodiment where the trestle 12 is substantially horizontal. There may also be installations which require the conveyor 14 and trestle portion 120 to be lower than depicted in FIG. 6 In such an instance, the fixed pulley 82 may be mounted at whatever elevation is necessary, Trestle 12 in such circumstances would slope downward to the appropriate height, and movable pulley 80 would be located at the required elevation to match the desired height of conveyor 14. As the rear end 24 of the shiploader moves rearwardly, the same relationship as previously mentioned for the embodiment in FIG. 6 would hold true. The distance between fixed pulley 82 and the new position 80, of the movable pulley 80 would equal the distance travelled by the rear end 24 of the shiploader. Therefore, the slack which would normally be formed by movement of the head end pulley 84 would by taken up by the distance between fixed pulley 82 and the new position of the movable pulley 80'. It can be seen that such an arrangement can provide for great flexibility in the configuration of conveyor 14.

The embodiment of FIG. 6 and modifications thereof are envisioned for use when the conveyor 14 is oriented substantially perpendicularly to the longitudinal axis 210 of the ship 200 to be loaded, that is in substantial longitudinal alignment with rear end rails 32. However, there may be instances when the conveyor which feeds the loader must be oriented at an angle, that is non-aligned relative to rails 32 in the horizontal plane. In such an instance the present invention may be configured in an alternate embodiment as illustrated in FIG. 3. This alternate embodiment enables continuous loading of the bridge mounted conveyor during pivotal and longitudinal movement of the rear end 24 of the bridge from a conveyor system oriented at an angle other than substantially perpendicular to the orientation of the carrier to be loaded. This is achieved by mounting the trestle mounted conveyor 14 beneath a primary feed conveyor 50 which approaches the rear end 24 of the bridge 100 at an angle to support rails 32 in the horizontal plane.

Referring to FIGS. 3 and 4 in detail, primary feed conveyor 50 approaches the rails 32 movably supporting the bride 100 at some angle in the horizontal plane, (as can be best seen in FIG. 4). Referring again to FIG. 3, primary feed conveyor 50 is supported on a housing 58. Also mounted on housing 58 are rails 72 which, via wheel assemblies 74, support the rear end 70 of trestle 12, which is mounted for movement along rails 72 in a direction substantially parallel to rails 32. As rear end 24 of the bridge 100 moves along rails 32, the front end of trestle 12 moves along rails 32 and the rear end 70 of trestle 12 moves along aligned rails 72 concomitantly with the movement of rear end 24 of loader 100. Rails 72 are sufficiently long enough to support rear end 70 of trestle 12 throughout the entire range of motion of trestle 12. Conveyor 14 is designed to be sufficiently long to remain beneath primary feed conveyor 50 throughout the entire range of movement of trestle 12. Primary feed conveyor 50 terminates in a hopper 52 and a chute 54. In this manner, continuous feeding from primary feed conveyor 50 to trestle mounted conveyor 14 takes place as trestle 12 moves back and forth along rails 32 and rails 72. Conveyor 14 feeds bridge conveyor 20 in the same manner as previously described. Therefore, as can be seen in FIG. 4, regardless of the angle of primary feed conveyor 50 relative to the rails 32, as long as the length of trestle mounted conveyor 12 is sufficient to allow it to remain positioned under hopper 52 and chute 54 as trestle 12 travels along rails 72 and rails 32 together with the movement of the rear end of the bridge, continuous feeding of the bridge mounted conveyor 20 is possible.

Figure 7:
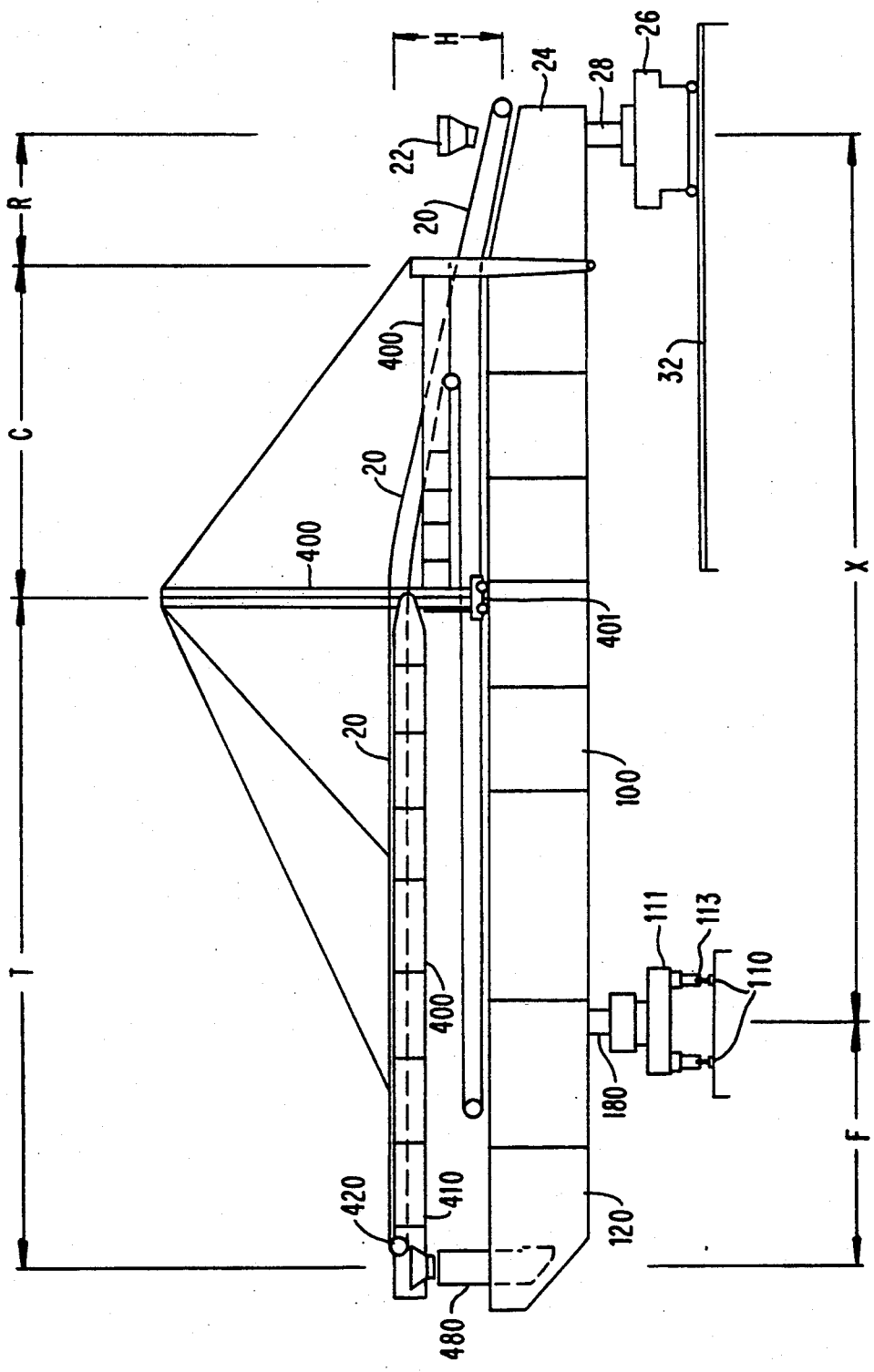
FIG. 7 depicts a side view detail of a shiploader showing an articulable boom movably mounted on the bridge and configured with a preferred conveyor design.

Referring now to FIG. 7, there is shown a side view of a shiploader constructed in accordance with the present invention. As can be seen, the bridge 100 extends horizontally, and has mounted on its upper surface a moveable superstructure or boom 400. A portion of bridge conveyor 20 is carried by boom 400, and the remaining portion is carried on the bridge 100 itself. Conveyor 20 is supported by a pulley and roller system, not shown, the design and implementation of which is commonly known in the art.

Figure 8:
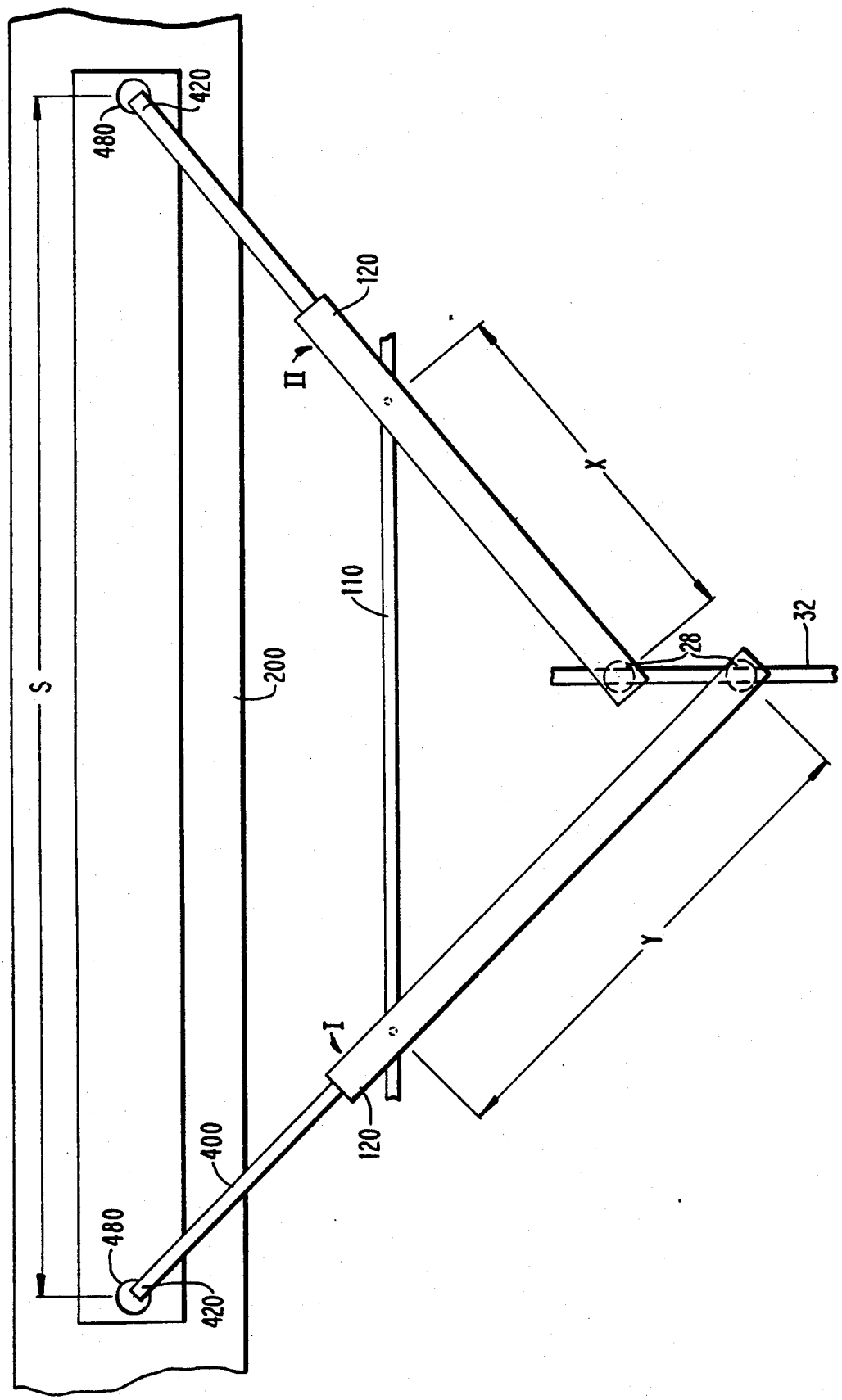
FIG. 8 is a top plan view showing two bridge spans.

Boom 400 is capable of traversing virtually the entire length of the span of the bridge 100, and may be driven for movement, for example, by a motorized drive 401 as shown, or other art recognized apparatus or methodology for guidedly moving a superstructure on a bridge. Boom 400 has a movable front boom portion 410 which carries the head end 420 of bridge conveyor 20 and upon which there is also mounted a feed chute 480. The feed chute 480 is oriented beneath the head end 420 of the bridge conveyor 20. Front boom portion 410—and accordingly the bridge conveyor head end 420 and feed chute 480—may be cantilevered past the front end of the bridge 120, and is articulable so as to accommodate differing feed requirements as material is loaded onto the ship. The cantilevered extension of the boom 400 past the front end 120 of the bridge 100 can be best seen, in plan view, in FIG. 8. FIG. 8 depicts two alternative bridge configurations designated I and II. Bridge configuration I is depicted in side view in FIG. 9, and bridge configuration II is depicted in side view in FIG. 7.

Figure 9:
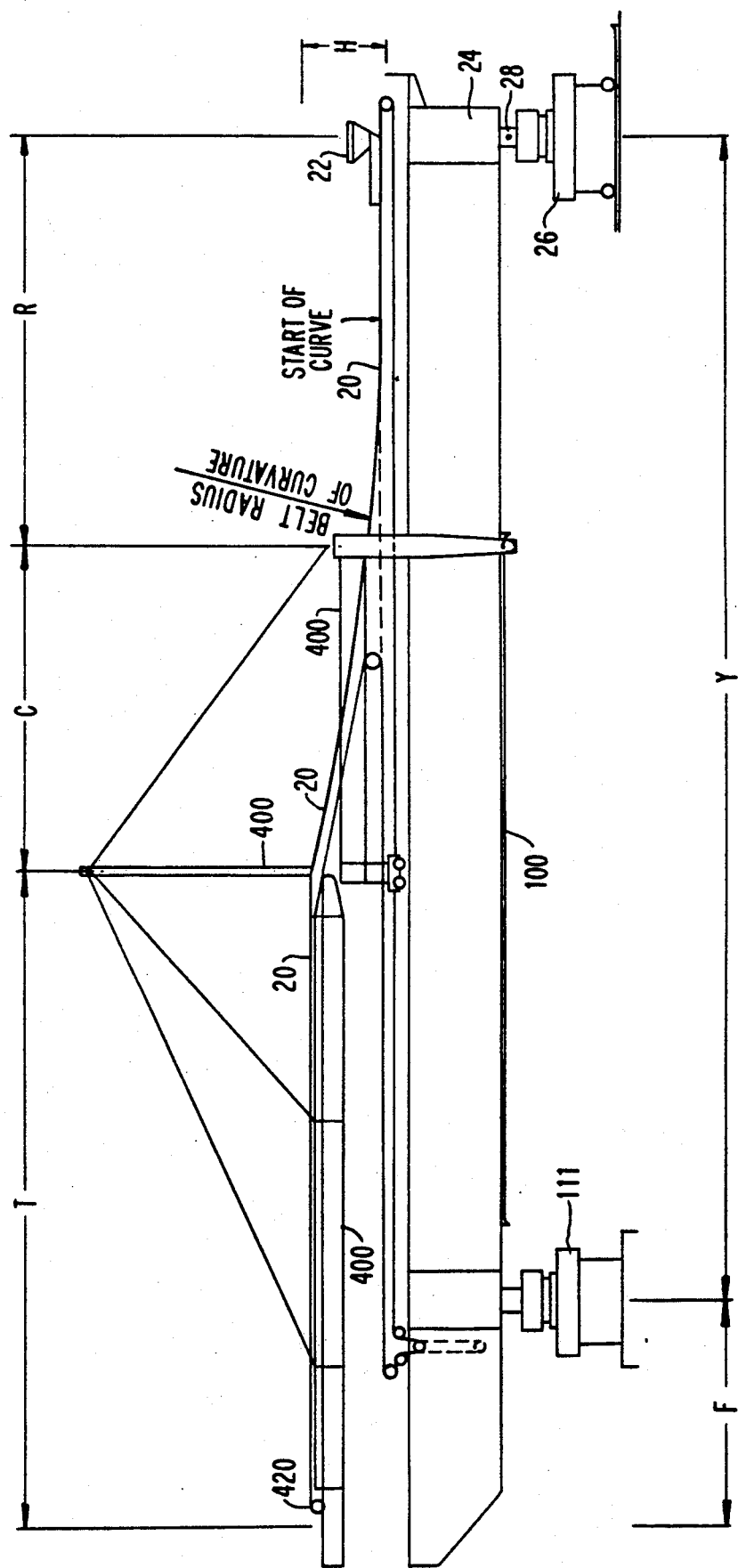
FIG. 9 depicts a side view of a shiploader configured with a less preferred, alternative conveyor design.

As previously mentioned, bridge mounted conveyor 20 is carried over a portion of its length upon boom 400. At its feed point, bridge conveyor 20 is mounted on the rear end 24 of the bridge 100 In bridge configuration I (FIG. 9), bridge conveyor 20 is in an essentially horizontal orientation beneath the feed point. However, it will be recognized that the conveyor 20 must rise to a higher level in order to be carried upon boom 400. As can be seen in FIG. 9, when the boom is at its rearmost position on the bridge, in order to accommodate the necessary transition in height of bridge conveyor 20, a significant length of bridge span must be dedicated to the transition of the conveyor from its initial height beneath the feed point of bridge conveyor 20 to the raised height to which it must travel to be atop boom 400. This length is necessary to accommodate the curvature of the belt which forms conveyor 20, which curvature is required in order to make the height transition. If the radius of that curvature were to be made too short, while the bridge span would be somewhat shortened, the belt of conveyor 20 would have a tendency to rise off the supporting rollers upon which it is carried (not shown), thereby leading to the possible loss of material being carried, premature wear, or even damage to the conveyor during operation, an unacceptable set of conditions. As shown in FIG. 9, in order to accomplish this transition in height of conveyor 20, and accordingly accommodate the required radius of curvature of conveyor 20, the length of span covered by conveyor 20 during transition must be large, thereby increasing overall bridge length, bridge mass, and also, not insignificantly, expense.

To avoid possible lifting of the belt during operation, and also to shorten the span of bridge 100, another embodiment of bridge 100 and conveyor 20, depicted in FIG. 7, is preferred. As shown in FIG. 7, the path of bridge conveyor 20 at the feed point is oriented so as to be upwardly sloping, allowing the conveyor to rise to the level of travel along boom 400 in a greatly reduced distance without passing through the transition curve depicted in FIG. 9, thereby requiring significantly less bridge span. For example, and referring to FIGS. 7, 8 and 9, pertinent shiploader design dimensions are given as follows: The length of ship to be loaded is given as dimension S. A boom requires a range of distance of travel on the bridge of dimension T, an additional length along the bridge of dimension C for the remaining boom superstructure, a length of cantilevered front end 120 of dimension F, a conveyor height transition of dimension H, and a bridge span portion of length R to accommodate the conveyor height transition. In the alternative designs to be considered, dimensions S,T,C,F and H are constant, but dimension R will vary depending upon the conveyor orientation at the feed point. A shiploader would thus require a bridge span of dimension Y if the conveyor 20 was to begin in a substantially horizontal orientation (FIG. 9), versus a bridge span of dimension X if the feed point of conveyor 20 was to begin in an upwardly sloping orientation, (FIG. 7). It will be noted from FIG. 8 that dimension X is significantly smaller than dimension Y. This is so because distance R must be greater when the conveyor 20 is substantially horizontal beneath the feed point.

To demonstrate the magnitude of economies realizable by utilizing the upwardly sloping conveyor design on a linear loader of the type contemplated by the present invention, an example is shown below.

EXAMPLE

In an exemplary design calculation, the desired shipboard length of coverage, depicted as dimension S in FIG. 8, is 135 meters. A boom is to be utilized having dimension T of 32 meters and a dimension C of 16 meters. To accommodate the full range of travel of the boom, the bridge front end 120 cantilevers beyond front support 111 for a length F of 9 meters. The bridge conveyor 20 must transition in height H 6 meters from its feed point to be carried on the boom.

A bridge utilizing the upwardly sloping conveyor of configuration I (FIG. 7), having an angle of slope of approximately 15 degrees, would require a dimension R along the bridge span of approximately 6 meters. The bridge span length, represented by dimension X in FIG. 7, would then be 45 meters. If, however, the bridge were to utilize the horizontal conveyor orientation of configuration II (FIG. 9), it would require a bridge span in which length R were 20 meters, length R being necessarily greater in configuration II to accommodate the radius of curvature of the belt of conveyor 20 (which radius would be approximately 125 meters). Thus, a longer bridge span, represented by dimension Y in FIG. 9, of 59 meters would result.

This great disparity in bridge span length may be seen in plan view in FIG. 8. It is readily apparent from the example given above that an upwardly sloping conveyor design, such as that depicted in the preferred embodiment of FIG. 7, can result in a considerable reduction in bridge span. When it is considered that each meter of bridge span can cost thousands of U.S. dollars, the great advantage of the upwardly sloping bridge conveyor design becomes readily apparent.

The feed point of conveyor 20 under chute 22 may be mounted along the upper surface of the bridge 100 or the bridge 100 may be configured to have a recess or open interior portion wherein a portion of conveyor 20 may be carried. Whether the conveyor is mounted in a recessed portion of the bridge or mounted on the upper surface of the bridge has no effect on the desired relative orientation of the conveyor beneath the feed point. That is, the conveyor 20 may be oriented at an upwardly sloping orientation regardless of its method of mounting, which method of mounting is purely a matter of engineering design choice.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, however, therefore, to be limited only as indicated by the scope of the claims appended hereto.

What is claimed is:

1. An apparatus for loading bulk material from a supply area onto a carrier having a longitudinal axis, said carrier during loading being disposed in a substantially fixed predetermined orientation, said apparatus comprising:

a movable trestle having a longitudinal axis;

a first belt conveyor carried by said movable trestle and having a longitudinal axis in substantial alignment with said longitudinal axis of said trestle;

an elongated linear shiploader having a longitudinal axis, a front end disposed proximate said carrier, a rear end disposed at a distance from said carrier, a front end support connected to said shiploader front end for pivotal movement of said shiploader front end relative to said front end support and for linear movement in a direction substantially parallel to the longitudinal axis of said carrier so as to vary an operating position of said shiploader front end, a support for said shiploader rear end, means for pivotally connecting said rear end support to said shiploader rear end such that said shiploader rear end and said rear end support are movable together linearly in a direction substantially perpendicular to said longitudinal axis of said carrier while simultaneously said shiploader rear end pivots relative to said rear end support around a fixed pivotal axis of rotation passing through said shiploader rear end and said rear end support, said simultaneous linear and pivotal movements being a function of said operating position of said shiploader front end;

a second belt conveyor carried on said linear shiploader in substantial alignment with said longitudinal axis thereof;

means for transferring material carried by said first belt conveyor to said second belt conveyor, said transfer means being mounted proximate said shiploader rear end on one of said trestle and said linear shiploader, said pivotal axis passing through said transfer means;

means for connecting said trestle to said rear end support so that said trestle moves in said direction substantially perpendicular to said longitudinal axis of said carrier concomitantly with and in a fixed position relative to said rear end support to maintain continuous positive registration between said transfer means and said pivotal axis; and said second belt conveyor having a portion proximate said pivotal axis, said second belt conveyor portion sloping upwardly from said shiploader rear end in a direction away from said shiploader rear end.

2. The apparatus according to claim further comprising:

at least one pair of rear end parallel rails disposed horizontally beneath said shiploader rear end and extending in a direction substantially perpendicular to said longitudinal axis of said carrier; and wherein said rear end support comprises a plurality of wheels guidedly movable along said rear end parallel rails.

3. The apparatus according to claim 2, further comprising:

at least one pair of front end parallel rails disposed horizontally beneath said shiploader front end and extending in a direction substantially parallel to said longitudinal axis of said carrier; and wherein said front end support comprises a plurality of wheels guidedly movable along said front end parallel rails.

4. The apparatus according to claim 3, wherein said movable trestle comprises:

a forward end disposed above said shiploader rear end;

means for supporting said forward end of said movable trestle in said elevated position above said shiploader rear end; and a plurality of wheels mounted on said forward end support and guidedly movable along said rear end parallel rails.

5. The apparatus according to claim 4, wherein said connection for linking said trestle to said rear end support comprises a substantially rigid link for connecting said rear end support to said movable trestle forward end support means.

6. The apparatus according to claim 5, wherein said front end support additionally comprises:

means for driving said front end support along said front end parallel rails in a direction substantially parallel to said longitudinal axis of said carrier, such that as said shiploader front end is driven to move in said parallel direction said shiploader front end imparts said simultaneous linear and pivotal movement to said shiploader rear end.

7. The apparatus according to claim 1, wherein said transfer means comprises:

a hopper having an entrance end and a discharge end, said hopper being mounted on said trestle, the entrance end of said hopper being beneath said first conveyor; and a chute mounted on said shiploader rear end having an entrance end and a discharge end, said entrance end of said chute being disposed beneath said discharge end of said hopper, said discharge end of said chute being disposed above said second belt conveyor for feeding material from said first belt conveyor, through said hopper and said chute, onto said second belt conveyor.

8. The apparatus according to claim 1, further comprising;
a third belt conveyor having an end portion disposed above said first belt conveyor and having a longitudinal axis out of substantial alignment with said longitudinal axis of said first conveyor, said first belt conveyor longitudinal axis extending in substantially perpendicular relation to said longitudinal axis of said carrier;
means for at least partially supporting said third belt conveyor end portion in said position above said first belt conveyor, said last mentioned means permitting the linear movement of said trestle in said direction substantially perpendicular to said longitudinal axis of said carrier; and
additional means for transferring material from said third belt conveyor to said first belt conveyor, and means for mounting said additional transfer means for permitting continuous positive registration between said additional transfer means and said first belt conveyor.

9. The apparatus according to claim 1, wherein said first belt conveyor has an original direction of travel and means for taking up slack in said first belt conveyor as said trestle moves concomitantly with said shiploader rear end, said take up means comprising:
a first pulley mounted on said trestle for concomitant movement with said trestle, said first pulley receiving said first belt conveyor and reversing the original direction of travel of said first belt conveyor; and
a second pulley fixedly mounted independent of said trestle for receiving said first belt conveyor from said first pulley and returning said first belt conveyor to said original direction of travel, said first pulley and said second pulley being spaced an initial distance apart when said rear end of said shiploader is at a minimum distance from said carrier and being spaced apart a distance which is equal to the sum of said initial distance and the distance moved by said trestle as said trestle moves concomitantly with said shiploader rear end.

10. An apparatus for loading bulk material from a supply area onto a carrier having a longitudinal axis, said carrier during loading being disposed in a substantially fixed predetermined orientation, said apparatus comprising:
a movable trestle having a longitudinal axis;
a first belt conveyor carried by said movable trestle and having a longitudinal axis in substantial alignment with said longitudinal axis of said trestle;
an elongated linear shiploader, said shiploader comprising:
a bridge having a longitudinal axis, a front end disposed proximate said carrier, a rear end disposed at a distance from said carrier, a front end support connected to said bridge front end for enabling pivotal movement of said bridge front end relative to said front end support and for enabling linear movement of said bridge front end in a direction substantially parallel to the longitudinal axis of said carrier so as to vary an operating position of said bridge front end, a support for said bridge rear end, means for pivotally connecting said rear end support to said bridge rear end so that said bridge rear end and said rear end support are movable together linearly in a direction substantially perpendicular to said longitudinal axis of said carrier while simultaneously said bridge rear end pivots relative to said rear end support around a fixed pivotal axis of rotation passing through said bridge rear end and said rear end support, said simultaneous linear and pivotal movement being a function of said operating position of said bridge front end, and;
a boom movably mounted on said bridge and having a boom end capable of extending beyond said bridge front end, said boom having a longitudinal axis in substantial alignment with said longitudinal axis of said bridge;
a second belt conveyor extending along said longitudinal axis of said bridge and said longitudinal axis of said boom and movably supported on a plurality of rollers, said second belt conveyor having a first portion carried at a first height on said bridge and a second portion carried at a second height on said boom, said second height being greater than said first height;
first means for transferring material carried by said first belt conveyor to a feed point on said second belt conveyor, said first portion of said second belt conveyor being proximate said feed point, said first transfer means being mounted proximate said bridge rear end on one of said trestle and said bridge and in substantial alignment with said pivotal axis;
second means for transferring material from said second belt conveyor onto said carrier, said second transfer means being mounted proximate said boom end;
means for connecting said trestle to said rear end support so that said trestle moves in said direction substantially perpendicular to the longitudinal axis of said carrier concomitantly with and in a fixed position relative to said rear end support to maintain continuous positive registration between said first transfer means and said pivotal axis; and
said second belt conveyor sloping upwardly from said first height to said second height so as to prevent said second belt conveyor from lifting away from said rollers in that region of the second belt where the second belt changes from being disposed at the first height to being disposed at the second height.

11. The apparatus according to claim 10, further comprising:
at least one pair of rear end parallel rails disposed horizontally beneath said bridge rear end and extending in a direction substantially perpendicular to said longitudinal axis of said carrier; and
wherein said rear end support comprises a plurality of wheels guidedly movable along said rear end parallel rails.

12. The apparatus according to claim further comprising:
at least one pair of front end parallel rails disposed horizontally beneath said bridge front end and extending in a direction substantially parallel to said longitudinal axis of said carrier; and wherein said front end support comprises a plurality of wheels guidedly movable along said front end parallel rails.

13. The apparatus according to claim 12, wherein said movable trestle comprises:
   a forward end substantially disposed in an elevated position above said bridge rear end;
   means for supporting said forward end of said movable trestle in said elevated position above said bridge rear end; and
   a plurality of wheels mounted on said forward end support means and guidedly movable along said rear end parallel rails.

14. The apparatus according to claim 13, wherein said means for connecting said trestle to said rear end support comprises a substantially rigid link for connecting said rear end support to said movable trestle forward end support means.

15. The apparatus according to claim 14, wherein said front end support additionally comprises:
   means for driving said front end support along said front end parallel rails in a direction substantially parallel to said longitudinal axis of said carrier, such that as said bridge front end is driven to move in said parallel direction said bridge front end imparts said simultaneous linear and pivotal movement to said bridge rear end.

16. The apparatus according to claim 10, wherein said first transfer means comprises:
   a hopper having an entrance end and a discharge end, said hopper being mounted on said trestle, the entrance end of said hopper being beneath said first conveyor; and
   a chute mounted on said bridge rear end having an entrance end and a discharge end, said entrance end of said chute being disposed beneath said discharge end of said hopper, said discharge end of said chute being disposed above said second belt conveyor for feeding material from said first belt conveyor, through said hopper and said chute, onto said second belt conveyor, at said feed point.

17. The apparatus according to claim 10, further comprising;
   a third belt conveyor having an end portion disposed above said first belt conveyor and having a longitudinal axis out of substantial alignment with said longitudinal axis of said first conveyor, said first belt conveyor longitudinal axis extending in substantially perpendicular relation to said longitudinal axis of said carrier;
   means for at least partially supporting said third belt conveyor end portion in said position above said first belt conveyor, said last mentioned means permitting the linear movement of said trestle in said direction substantially perpendicular to said longitudinal axis of said carrier; and
   third means for transferring material from said third belt conveyor to said first belt conveyor, and means for mounting said third transfer means for permitting continuous positive registration between said third transfer means and said first belt conveyor.

18. The apparatus according to claim 10, wherein said first belt conveyor has an original direction of travel and means for taking up slack in said first belt conveyor as said trestle moves concomitantly with said bridge rear end, said take up means comprising:
   a first pulley mounted on said trestle for concomitant movement with said trestle, said first pulley receiving said first belt conveyor and reversing the original direction of travel of said first belt conveyor; and
   a second pulley fixedly mounted independent of said trestle for receiving said first belt conveyor from said first pulley and returning said first belt conveyor to said original direction of travel, said first pulley and said second pulley being spaced an initial distance apart when said rear end of said shiploader is at a minimum distance from said carrier and being spaced apart a distance which is equal to the sum of said initial distance and the distance moved by said trestle as said trestle moves concomitantly with said bridge rear end.

* * * * *